May 2, 1939.  K. KUSAKA ET AL  2,156,263
METHOD OF MANUFACTURING IRON BY DIRECT REDUCTION
Filed Jan. 6, 1937
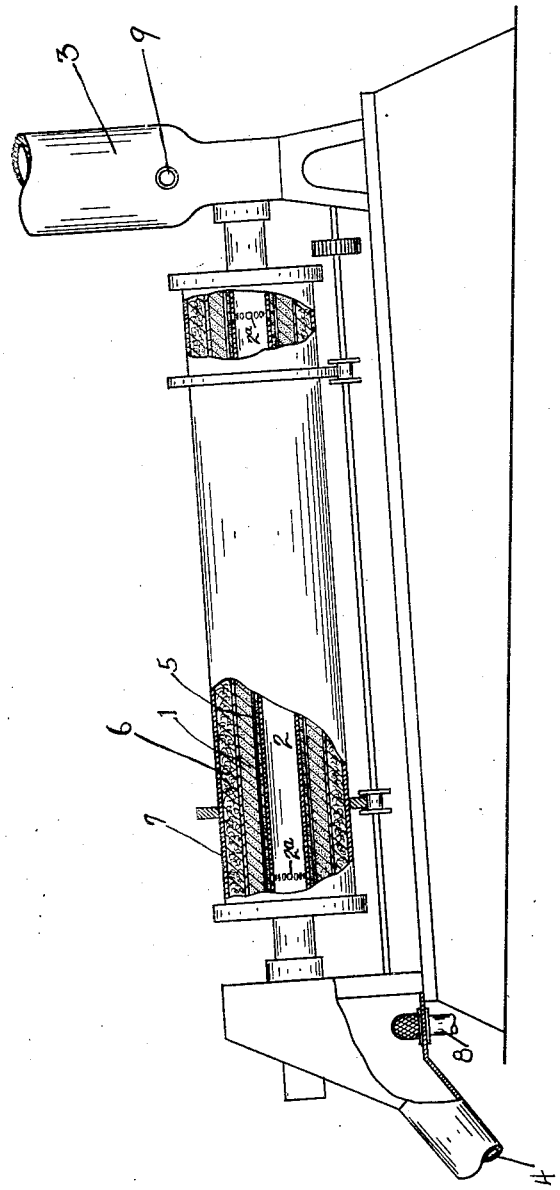
Inventors:
KAZUJI KUSAKA
HARUYUKI ASHIDA
By Francis C. Boyce
Attorney Patented May 2, 1939

2,156,263

UNITED STATES PATENT OFFICE 2,156,263

METHOD OF MANUFACTURING IRON BY DIRECT REDUCTION

Kazuji Kusaka and Haruyuki Ashida, Dairen, Manchukuo, assignors to Minami Manshu Tetsudo Kabushiki Kaisha (South Manchuria Railway Co.), Dairen, Manchukuo, a corporation of Japan Application January 6, 1937, Serial No. 119,267
In Japan July 3, 1936

4 Claims. (Cl. 75—11)

The present invention relates to a method of manufacturing sponge iron, and its object is to obtain sponge iron as a material for the manufacture of refined steel.

Methods of obtaining iron by direct reduction from finely divided iron ore, using charcoal, coke, heavy oil or reducing gas produced in a tubular furnace of a horizontally inclined rotary type have been tried for years throughout the world, but none has ever been capable of producing reduced iron of high quality, at a low cost. In a pamphlet published in 1927 by the Bureau of Mines of the U. S. A., the advantages and disadvantages of these methods have been discussed.

Other methods are known comprising reducing ore with coke in a tubular furnace of refractory brick, identical to a cement kiln, in which heating is effected by heavy oil.

Other methods comprising reducing ore with coke in a cast iron tube heated from without by combustion gas, are also not novel.

Still other methods are known which comprise using a steel tube, the reduction being effected by gas, while the tube is heated from without by combustion gas.

According to the present invention the method of manufacturing sponge iron varies from the above mentioned methods considerably in that it produces a product of superior quality, at a low cost, and in large quantities. The invention has also for its object a method of manufacturing sponge iron by direct reduction in a substantially horizontally inclined and rotary tubular furnace in which the material to be reduced, that is, oxide ore, is introduced into one end of the furnace, while the product is discharged from the other end of the furnace, followed by causing the reducing gas to flow partly through the furnace, and, partly, over the externally heated surface.

More specifically, the present invention covers a method of manufacturing sponge iron by direct reduction, the method being characterized in that reducing gas is passed over the product to extract heat therefrom, and subsequently partly over the heating means and, partly, through the reaction zone.

According to the invention, a considerable amount of heat is saved. In addition, the reducing gas outside the inner wall of the reaction zone prevents oxidation of the heating means and thus extends the life of the furnace and the heating means considerably, it also enables the reaction to be effected at a high temperature, for instance between 800 and 1100° C. In accordance with the invention it is possible to manufacture from iron ore, by direct reduction, the sponge iron used as the material for high grade steel cheaply and in large quantities.

According to this invention small lumps of sinter or powder of iron ores or iron sand, or its sinter are used as material to be reduced.

An apparatus suitable for carrying out the method herein described is illustrated in side view in the accompanying drawing, parts being broken away and shown in section. Said apparatus comprises an inclined rotary tubular furnace of the continuous type, and as shown herein is provided with a double-walled reaction zone, the inner wall being formed by a tube 2 communicating at its opposite ends respectively, with a receptacle 3 and an outlet 4 for the ore to be treated. On the periphery of the tube 2 is disposed an electric heating element 5, said element being disposed between the tube 2 and the outer wall 1, which latter is of refractory brick. The double walled furnace thus constructed is preferably provided with a covering of asbestos wool 6, the whole being enclosed within a steel casing 7. The gas is admitted into the tube 2 through the inlet 8 at the lower end of the furnace, the main portion of the gas passing up through the tube in contact with the ore therein. However, the tube 2 is provided with perforations 2a near its opposite ends, whereby some of the gas will escape from the reaction zone within said tube through the perforations near the lower end of the tube, into the space between the said tube and the outer wall 1, and, after traversing the length of said space, will pass back into the tube through the openings 2a near the upper end of said tube, thus again uniting with the main body of exhaust gas as it passes out through the upper end of tube 2 and into the lower end of the ore receptacle 3, where said gas meets with air admitted through a port 9 and is burned before passing to the flue, whereby the ore in the receptacle 3 is preheated before passing into the tube 2. The gas that escapes into the space between the tube 2 and outer wall 1 serves to protect the heating element 5 as well as the outer periphery of the tube against oxidation.

Thus, the object of this arrangement is to continuously manufacture sponge iron, at a saving of heat, and to safely carry out the operation by passing reducing gas along the reducing zone, that is within and without thereof.

Preferably the inner wall of the reaction zone is supported wholly, or substantially wholly, by refractory brick. In this way it is prevented from deformation. In addition, the heating element is outwardly enclosed by heat-insulating material inserted between the inter-wall space of the double walled reaction zone.

The following are the features of this invention in greater detail:

By using a rotary furnace of inclined horizontal type consisting of a double steel tube for the purpose of large production, the reducing gas may be introduced from the lower part of the interior of the tube, and before it enters the flue after reducing the iron ore coming from the upper part, the remaining gas is burnt to preheat the ore, provision being made for admission of air for this purpose, as hereinbefore described.

The inner tube being supported throughout its length, as above described, by a covering of refractory brick which in turn is enclosed within an outer tube, the inner tube is thus protected from deformation under its own weight.

By causing a part of the reducing gas to pass to the exterior of the tube 2 and in contact with the electric heating element is hereinbefore described the life of both the tube and heating element is considerably lengthened because of the prevention of oxidation, thus lowering the cost of production whereby the product can be economically produced in large quantities.

In carrying out the method herein described, rich ore not finely divided is used.

According to this invention, it is possible to manufacture excellent and compact reduced iron by effecting reduction by reaction at such high temperatures as 800 to 1100° C., which is widely different from the known reaction at 700° C. Moreover, the present method renders the operation to be performed continuous, this being highly advantageous from an industrial point of view. Furthermore, as regards the utilization of heat, the waste gas is not only utilized to preheat the ore, but also the heat of the reduced ore is used to preheat the fresh reducing gas in the lower end of the furnace body. Again, the gas used for protecting the electric heating wire on the inner tube may be all introduced into the interior of the inner tube. Therefore, this invention is also greatly advantageous in the saving of heat.

As a rule, water gas is employed for the reaction and more or less solid fuel is mixed with the ore. The reduced iron produced with the furnace of this invention is quite compact despite its sponge form, as compared with the ordinarily reduced iron. This is very convenient for its subsequent remelting into steel. In addition there is an increase in the output.

The following is an example of the analysis of the iron reduced according to this invention:

| | Per cent |
|---|---|
| Carbon | 0.06 |
| Silicon | 0.01 |
| Manganese | 0.05 |
| Phosphorus | 0.01 |
| Sulphur | 0.01 |

Thus, the iron reduced according to the present invention rather belongs to the class of high grade iron. Of course, it is not merely used in its original state, but it may be remelted into iron (steel) particles or ingot.

As explained above, in this method a small lump of rich iron ore is reduced with water gas and a small quantity of solid fuel, and using a comparatively small furnace with a steel tube as the inner tube, iron or steel is manufactured directly, but as it is very efficient in every respect, the furnace does not lose its life as an industrial furnace.

If iron sand or finely divided iron ore as it is or in its sintered state is used, and hydrogen gas, carbon monoxide or charcoal is employed for the reduction and the inner tube is formed of carbon steel, or refractory brick, the same object may be attained by this method.

We claim:

1. Method of manufacturing sponge iron by direct reduction which comprises passing the material to be reduced through a reaction tube having a heating wire disposed on its periphery and subjecting the material to a reducing gas stream, said gas being caused to move partly through the reaction tube and partly over the same thereby preventing oxidation of the heating wire, and also effecting the reaction at a very high temperature.

2. Method of manufacturing sponge iron by direct reduction which comprises passing the material to be reduced through a reaction tube having a heating wire disposed on its periphery and subjecting the material to a reducing gas stream, said gas being caused to move partly through the reaction tube, and partly over the same thereby preventing oxidation of the heating wire, and also effecting the reaction at a temperature of 800–1100° C.

3. Method of manufacturing sponge iron by direct reduction which comprises passing sinter of finely divided iron ore as material to be reduced through a reaction tube having a heating wire disposed on its periphery and subjecting the material to a reducing gas stream, said gas being caused to move partly through the reaction tube, and partly over the same thereby preventing oxidation of the heating wire, and also effecting the reaction at a very high temperature.

4. Method of manufacturing sponge iron by direct reduction which comprises passing small lumps of rich iron ores as material to be reduced through a reaction tube having a heating wire disposed on its periphery and subjecting the material to a reducing gas stream, said gas being caused to move partly through the reaction tube and partly over the same thereby preventing oxidation of the heating wire, and also effecting the reaction at a very high temperature.

KAZUJI KUSAKA.
HARUYUKI ASHIDA.